(12) United States Patent
Dupuis et al.

(10) Patent No.: US 7,902,725 B2
(45) Date of Patent: Mar. 8, 2011

(54) DEVICE FOR FIXING A FIRST EQUIPMENT ITEM TO A SECOND EQUIPMENT ITEM, WITH ACTIVE MICROPOSITIONING

(75) Inventors: Jean Dupuis, Auribeau sur Siagne (FR); Laurent Blanchard, Mouans-Sartoux (FR)

(73) Assignee: Thales (FR)

( * ) Notice: Subject to any disclaimer, the term of this patent is extended or adjusted under 35 U.S.C. 154(b) by 322 days.

(21) Appl. No.: 12/159,890

(22) PCT Filed: Dec. 29, 2006

(86) PCT No.: PCT/FR2006/051441
§ 371 (c)(1),
(2), (4) Date: Dec. 22, 2008

(87) PCT Pub. No.: WO2007/077385
PCT Pub. Date: Jul. 12, 2007

(65) Prior Publication Data
US 2009/0174287 A1    Jul. 9, 2009

(30) Foreign Application Priority Data
Jan. 3, 2006    (FR) .................................. 06 50016

(51) Int. Cl.
H01L 41/09    (2006.01)
H01L 41/053    (2006.01)
(52) U.S. Cl. ......... 310/328; 310/311; 310/338; 310/348; 310/354
(58) Field of Classification Search .................. 310/311, 310/328, 348, 354
See application file for complete search history.

(56) References Cited

U.S. PATENT DOCUMENTS

| 3,320,580 | A | * | 5/1967 | Sykes ........................... 367/157 |
| 4,751,821 | A |   | 6/1988 | Birchard |
| 4,961,627 | A |   | 10/1990 | Swain et al. |
| 5,021,798 | A |   | 6/1991 | Ubhayakar |
| 2004/0201327 | A1 | * | 10/2004 | Cleveland et al. ............. 310/348 |
| 2008/0290221 | A1 | * | 11/2008 | Dupuis et al. ............... 244/172.6 |

FOREIGN PATENT DOCUMENTS

| EP | 0075063 | 3/1983 |
| FR | 2724236 | 3/1996 |
| FR | 2770308 | 4/1999 |
| GB | 2229789 | 10/1990 |
| WO | WO8505464 | 12/1985 |
| WO | WO9503562 | 2/1995 |

* cited by examiner

*Primary Examiner* — Thomas M Dougherty
(74) *Attorney, Agent, or Firm* — Lowe Hauptman Ham & Berner, LLP

(57) ABSTRACT

A device (D) is dedicated to fixing a first piece of equipment (E1) relative to a second piece of equipment (E2). The device has (i) a structure having a rigid central body (CC) prolonged by two approximately identical terminal bodies (CT1, CT2) each having a neck defining a flexible intermediate part (PD1, PD2) that is symmetric relative to a symmetry element, prolonged by a rigid internal part (PI1, PI2) that is symmetric relative to the symmetry element and joined to one of the ends of the central body (CC), and by a rigid external part (PE1, PE2) that is symmetric relative to a symmetry element, spaced from the internal part, and intended to be joined to the first (E1) or second (E2) piece of equipment. The device has (ii) at least two piezoelectric transducers (T11-T22) with each responsible for converting either an axial dimensional change into a measurement current representing the amplitude of the change, or a control current into a corresponding axial dimensional change. The device has (iii) control means (MC) responsible for determining at least one axial dimensional change to locate the first piece of equipment (E1) relative to the second piece of equipment (E2).

20 Claims, 3 Drawing Sheets

DEVICE FOR FIXING A FIRST EQUIPMENT ITEM TO A SECOND EQUIPMENT ITEM, WITH ACTIVE MICROPOSITIONING

CROSS-REFERENCE TO RELATED APPLICATIONS

The present Application is based on International Application No. PCT/FR2006/051441, filed on Dec. 29, 2006, which in turn corresponds to French Application No. 0650016, filed on Jan. 3, 2006, and priority is hereby claimed under 35 USC §119 based on these applications. Each of these applications are hereby incorporated by reference in their entirety into the present application.

FIELD OF THE INVENTION

The invention relates to devices designed to fix a first piece of equipment to or relative to a second piece of equipment with great precision or even very great precision.

BACKGROUND OF THE INVENTION

In some fields, such as in the field of space technology for example, some pieces of equipment are subjected to thermal and/or mechanical stresses which impair their form stability and setting stability (the set of six parameters $x, y, z, \theta x, \theta y, \theta z$ describing the relative position and orientation of two solids is called the setting). They must therefore be subjected to stress relaxation and/or to micropositioning. This is the case, for example, with the primary mirrors of telescopes, or with some spatial observation instruments, or again with gradiometers.

When such a piece of equipment is joined to another piece of equipment by means of a fixing device (or joint), its setting and form stabilities may also be disturbed by thermal and/or mechanical stresses which this other piece of equipment and/or its fixing device undergo. This is what the person skilled in the art calls interface deformation.

In order to limit these disturbances, which lead to deformations and/or displacements and/or rotations that notably prevent initially fixed stability performance from being maintained, passive fixing devices are generally used that have chosen flexibility in certain directions and are made of temperature-stable materials (such as carbon-resin composites for example).

These fixing devices may also comprise isostatic supports, such as those for example which ensure three-point holding using a passive fixing device such as those used for mirrors (notably described in the patent documents FR 97/13439 and FR 94/10710), an A-frame support or an X-frame support. But these isostatic supports may generate residual stresses due notably to design of the flexibilities at launch loads.

Passive thermal control devices may also be provided, for example of the MLI (multi-layer insulation) type, and/or active thermal control devices, such as heaters or heat pipes for example.

It is also possible to eliminate the mechanical stresses of integration at the nominal operating temperature by precisely clamping the equipment beforehand.

All these means employed to limit the disturbances undergone by equipment prove costly due to the complexity of their mechanical production and/or the integration methods they require.

SUMMARY OF THE INVENTION

The aim of the invention is therefore to improve the situation.

To this end, it proposes a device designed to fix a first piece of equipment relative to a second piece of equipment, comprising:

- a structure comprising a rigid central body and two approximately identical terminal bodies, prolonging two opposite ends of the central body, and each comprising a neck defining a flexible intermediate part that is symmetric relative to a symmetry element (plane or axis of symmetry), having a first extension relative to this symmetry element, situated in a central position and prolonged (i) by a rigid internal part that is symmetric relative to the symmetry element, having a second extension relative to the symmetry element greater than the first and joined to one of the ends of the central body, and (ii) by a rigid external part that is symmetric relative to the symmetry element, having a third radial extension greater than the first, spaced from the internal part and intended to be joined to the first or second piece of equipment;
- at least two piezoelectric transducers respectively housed in the free spaces defined between the internal and external parts of the two terminal bodies and each responsible for converting either an axial dimensional change into a measurement current representing the amplitude of said change, or a control current into a corresponding axial dimensional change; and
- control means responsible for determining at least one axial dimensional change for at least one of the transducers in order to locate the first piece of equipment in a chosen position relative to the second piece of equipment.

The device according to the invention may comprise other features that may be adopted separately or in combination, and notably:

- its control means may be responsible for determining an axial dimensional change for each transducer in order to locate the first piece of equipment in a chosen position relative to the second piece of equipment;
- its control means may be responsible, when they receive a measurement current coming from a transducer of one of the terminal bodies caused by a first misorientation of its external part relative to its internal part, for determining the corresponding axial dimensional change and for generating a control current destined for the transducer of the other terminal body so that this transducer converts it into an axial dimensional change able to cause a second misorientation of the external part of its terminal body relative to its internal part, opposed to the first misorientation;
- each free space in a terminal body may house at least one of the first and second piezoelectric transducers intended to function antagonistically. In this case the control means may be responsible, when they receive a measurement current coming from the first transducer of one of the terminal bodies caused by a first misorientation of its external part relative to its internal part, for determining the first corresponding axial dimensional change and generating (i) a first control current destined for the second transducer of the same terminal body so that this transducer converts it into a second axial dimensional change of opposite sign to the first axial dimensional change and with the same amplitude; (ii) a second control current destined for the transducer of the other terminal body so that this transducer converts it into a third axial dimensional change causing a second misorientation of the external part of its terminal body relative to its internal part, opposed to the first misorientation, and (iii)

a third control current destined for the second transducer of this other terminal body so that this transducer converts it into a fourth axial dimensional change of opposite sign to the third axial dimensional change and with the same amplitude;

each free space in a terminal body may house three piezoelectric transducers placed at 120° to each other;

the control means may be responsible, when they receive at least one measurement current coming from at least one of the transducers of one of the terminal bodies caused by a first misorientation of its external part relative to its internal part, for determining each corresponding axial dimensional change and generating (i) a control current destined for each transducer of this same terminal body which has not transmitted a measurement current, so that this transducer converts it into an axial dimensional change, and (ii) control currents destined for the three transducers of the other terminal body so that these transducers convert them into axial dimensional changes causing a second misorientation of the external part of its terminal body relative to its internal part, opposed to the first misorientation;

at least one of the internal and external parts of each terminal part may be a platform of chosen shape, and the intermediate part of each terminal body may have a diabolo shape;

its transducers may be produced in a piezoelectric material chosen from piezoelectric single crystals and piezoelectric ceramics;

the transducers may consist of at least one stack of at least one layer of piezoelectric material;

it may comprise at least one sensor responsible for delivering signals representing at least one physical quantity. In this case, its control means are responsible for determining the axial dimensional changes depending on the signals delivered by each sensor;

its control means may be activated and deactivated at chosen times; and its control means may be arranged so as to operate in position-control mode.

The invention also proposes a piece of equipment provided with a fixing device of the type of that presented in the preceding.

The invention is particularly well suited, albeit in a nonexclusive manner, to the field of space technology, to the generation of scan movement(s) on a piece of equipment, and to other dimensional measurements (interferometry) occurring in the very fine positioning of equipment.

BRIEF DESCRIPTION OF THE DRAWINGS

Other features and advantages of the invention will become apparent on examining the detailed description below and the appended drawings in which.

The appended drawings will be able not only to serve to complete the invention, but also to contribute to its definition if need be.

The object of the invention is to enable active fixing of a first piece of equipment to a second piece of equipment.

DETAILED DESCRIPTION OF THE INVENTION

In what follows it is assumed by way of nonlimiting example that the first piece of equipment is a primary mirror of an observation instrument and that the second piece of equipment is this observation instrument, which instrument is onboard a satellite fulfilling an space mission for observation, from space, of the Earth or a part of the universe.

However, the invention is not limited to these types of equipment. In fact it also relates to any group of at least two pieces of equipment, whether spatial or not, intended to be joined to each other by means of a fixing device. It also relates to the situations in which two pieces of equipment must be quasi-statically aligned or micropositioned relative to each other.

Figure 1A:
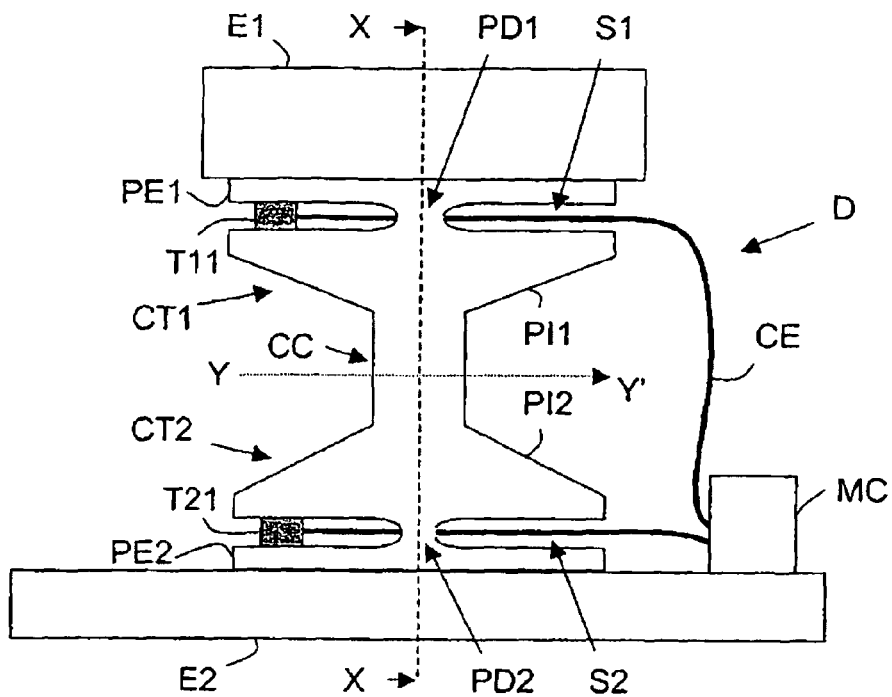
FIGS. 1A and 1B illustrate in schematic front views a first exemplary embodiment of a fixing device according to the invention, of the "active flexible blade" type, in the inactive phase and the active phase respectively.
Figure 1B:
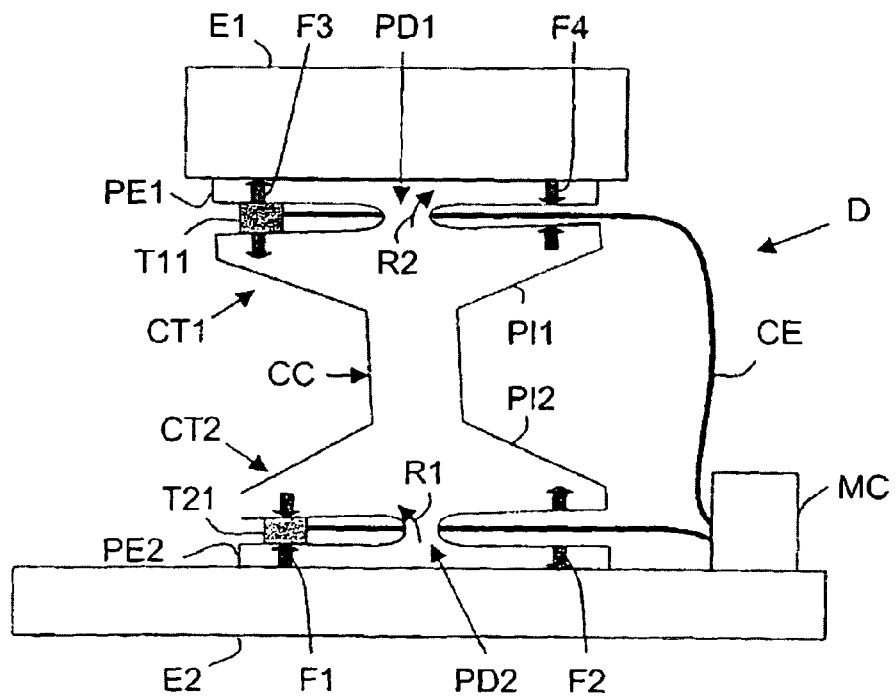

Reference is made first to the FIGS. 1A and 1B in order to describe a first exemplary embodiment of a fixing device D according to the invention, of the "active flexible blade" or the active "IPN beam" type, intended to join first E1 and second E2 pieces of equipment to each other. When the device D is an active flexible blade, it has a very low extension in the direction perpendicular to the plane of the page (marked in FIG. 1A by the axes XX and YY'). When the device D is a kind of active IPN beam, it has a relatively large extension in the direction perpendicular to the plane of the page (in this case, FIGS. 1 and 2 represent cross-sectional views).

According to the invention, the fixing device D comprises at least one (fixing) structure, comprising a central body CC and two terminal bodies CT1 and CT2 (or CTi, with i=1 and 2), at least two piezoelectric transducers Tij, and a control module MC.

The central body CC is rigid in type. Here it has the general shape of a rectangular parallelepiped having a symmetry element of the plane-of-symmetry type (perpendicular to the plane of the page and marked by the axis XX) and two opposite ends perpendicular to the plane of symmetry. But other forms are conceivable. This is notably the case in FIG. 3 where the central body CC has a circular cylindrical general shape of which the axis XX constitutes the axis of symmetry.

The first CT1 and second CT2 terminal bodies are approximately identical. They respectively prolong the two opposing ends of the central body CC. "Prolonging an end" is here understood to mean either being fixedly joined to the end or being part of the same piece as the central body CC.

Each terminal body CTi has a neck, i.e. a narrowing, which defines a flexible intermediate part PDi, the two ends of which are respectively prolonged by a rigid internal part PIi and a rigid external part PEi. This neck is intended to bend (in the plane of the page) under the stresses generated by the transducers (or actuators) Tij. It may be rounded or straight (i.e. of constant width).

The flexible intermediate part PDi is situated in a central position of the structure, i.e. in the area through which the plane of symmetry passes (marked by the axis XX). Furthermore, it is preferably symmetric in shape relative to the plane of symmetry. In addition, it has a (first) extension in the direction YY', perpendicular to the plane of symmetry (and hence to the axis XX), and on both sides of this plane of symmetry.

The internal rigid part PIi is joined to one of the two opposite ends of the central body CC. It has, for example, a symmetric shape relative to the plane of symmetry. For example, it has the shape of a beam attached at its center to the intermediate part PDi and to the central body CC. This beam has a (second) extension on both sides of the plane of symmetry (in the direction YY') which is notably greater than that of the central body CC.

The external rigid part PEi is intended to be joined to the first E1 or second E2 piece of equipment. In the examples illustrated on the assembly in the figures, the external rigid part PE1 of the first terminal body CT1 is joined to the first piece of equipment E1, while the external rigid part PE2 of the second terminal body CT2 is joined to the second piece of equipment E2.

Each external rigid part PEi has, for example, a symmetric shape relative to the plane of symmetry. For example, it too has the shape of a beam attached at its center to the intermediate part PDi and to one of the pieces of equipment. This beam has a (third) extension on both sides of the plane of symmetry (in the direction YY') which is notably greater than that of the central body CC and approximately equal to that of the internal rigid part PIi.

In contrast to the internal rigid part PIi, which preferably has beveled sides on one of its faces (on the side of the central body CC) to increase the rigidity of the structure, the external rigid part PEi is preferably rectangular in section.

The second and third extensions of the internal PIi and external PEi parts depend on the capabilities of the transducers (or actuators) Tij in terms of stress. In effect, the further the actuator is placed from the axis XX, the lower the angular deflection at an equal (lengthwise) actuation capability. An actuator is therefore placed far from the center of rotation in order to reduce the actuation stresses, whereas it is placed close to the center of rotation in order to reduce its stroke.

Due to the neck, a free space Si is defined between the internal PIi and external PEi parts of each terminal body CTi, of course outside the area occupied by the intermediate part PDi. In the example illustrated in FIGS. 1A and 1B, the noncircular shapes of the internal PIi and external PEi parts lead to a subdivision of the free space Si into two subspaces defining two housings of approximately identical size (at rest) on both sides of the intermediate part PDi.

In the example illustrated in FIGS. 1A and 1B, the device D comprises only two piezoelectric transducers Tij (T11 and T21, here j=1). A first piezoelectric transducer T11 is housed in one of the two housings defined by the free space S1 of the first terminal body CT1, and a second piezoelectric transducer T21 is housed in one of the two housings defined by the free space S2 of the first terminal body CT2.

In the example illustrated in FIGS. 1A and 1B, the first T11 and second T21 piezoelectric transducers are both placed in housings that are situated on the same side of the structure (relative to the plane of symmetry). But that is not necessary.

Each piezoelectric transducer Tij is joined to internal PIi and external PEi parts of its terminal body CTi in a chosen location in its free space Si.

Furthermore, each piezoelectric transducer Tij is able to effect two types of conversion. Either it converts the axial dimensional change (in the plane of the page and hence in a direction approximately parallel to the axis XX), to which it is subjected owing to a mechanical and/or thermal stress to which the terminal body CTi it belongs to is subjected, into a measurement current representing the amplitude of this change, or it converts a control current from the control module MC into a corresponding axial dimensional change.

An "axial dimensional change" is here understood to mean either an increase in size in a direction approximately parallel to the axis XX (associated with an amplitude of positive sign), or a reduction in size in a direction approximately parallel to the axis XX (associated with an amplitude of negative sign).

For example, and as illustrated in all the figures, the transducers Tij have the shape of identical blocks and are of equal height at the distance separating the internal PIi and external PEi parts from their terminal body CTi. The shape of these blocks Tij may, for example, be parallelepipedal (as illustrated in FIGS. 1 and 2) or cylindrical with a circular section (as illustrated in FIG. 3).

Each transducer Tij is, for example, made of a piezoelectric material such as piezoelectric single crystals. It may also be made with piezoelectric ceramics. Generally speaking, any type of piezoelectric material may be used as long as it generates a measurement currant large enough to be analyzable by the control module MC and/or be the object of an axial dimensional change suited to the application in response to a control current from the control module MC.

Piezoelectric single crystals are particularly advantageous due to the fact that they have a great elongation capability, typically 2% (which is around ten times more than the elongation provided by piezoelectric ceramics).

Each transducer Tij may optionally consist of a stack of at least one layer of piezoelectric material and of a layer of insulating material.

The control module MC is coupled to the transducers Tij by electrical conductors (for example, cables) CE. It is responsible, generally speaking, for determining at least one axial dimensional change for at least one of the transducers Tij of the device D in order to place the first piece of equipment E1 in a chosen position relative to the second piece of equipment E2.

More precisely, the control module MC may be designed in different ways in order to confer one or more functions on the device D.

For example, the control module MC may determine only the dimensional change (axially along XX) of each transducer Tij so as to confer a micropositioning function on the device D. In this case it only transmits to the transducers Tij control currents that they must convert into axial dimensional changes in order to place the first piece of equipment E1 in a chosen precise position relative to the second piece of equipment E2.

To facilitate the micropositioning function, the device may comprise one or more sensors of physical quantities, delivering signals representing said physical quantities for the control module MC. This sensor (or these sensors) may, for example, effect laser metrology and/or a determination of stress(es) to be relaxed. In this case, the control module MC determines the control currents destined for the various transducers Tij depending on instructions and on signals provided by the sensor(s).

It will be noted that the device D may be used with the sole aim of relaxing one or more stresses when it is equipped with a strain gage (or strain gages).

The control module MC may also be responsible for at least partially compensating for the effect of a stress to which at least one of its terminal bodies CTi is subjected. More precisely, when a terminal body CTi, for example CT2 (as illustrated in FIG. 1B), is subjected to a stress, this translates into a first misorientation (inclination marked by the arrow R1) of its external part PE2 relative to its internal part PI2 due to the flexibility of the intermediate part PD2 which connects them. This misorientation (R1) leads to a first axial dimensional change, with a first amplitude, of the transducer T21 (marked by the arrows F1). In the example illustrated in FIG. 1B, the first axial dimensional change is a reduction in thickness (but this may be the contrary). At the same time, the distance which separates the internal PI2 and external PE2 parts of the side opposite the transducer T21 increases by a value equal to the first amplitude, as is marked by the arrows F2.

In response to this first axial dimensional change (reduction) the transducer T21 generates a measurement current representing the first amplitude (and its sign). When the control module MC receives this measurement current (via the conductor CE), it determines the corresponding axial dimensional change and generates a control current destined for the transducer T11 of the first terminal body CT1. When the transducer T11 receives this control current, it converts it into a second axial dimensional change causing a second misorientation of the external part PE1 of its terminal body CT1 relative to its internal part PI1 (marked by the arrow R2). This second misorientation (R2) is opposed to the first misorientation (R1) in order to compensate for it. The second axial dimensional change is here an increase in thickness, with an amplitude approximately equal to the first amplitude, but of opposite sign (shown by the arrows F3). This second axial dimensional change (F3) at the same time causes the reduction in the distance which separates the internal PI1 and external PE1 parts of the first terminal body CT1 on the side opposite the transducer T11 by a value approximately equal to the first amplitude, as marked by the arrows F4.

It will be noted that in order to ensure this control function of compensating for the effect of a stress, the control module MC may optionally operate in servocontrol mode (with respect to a given stress). It may also operate in servocontrol mode with respect to a given axial dimensional change.

It will also be noted that the device D may provide both a micropositioning function and a stress-compensation function.

Figure 2A:
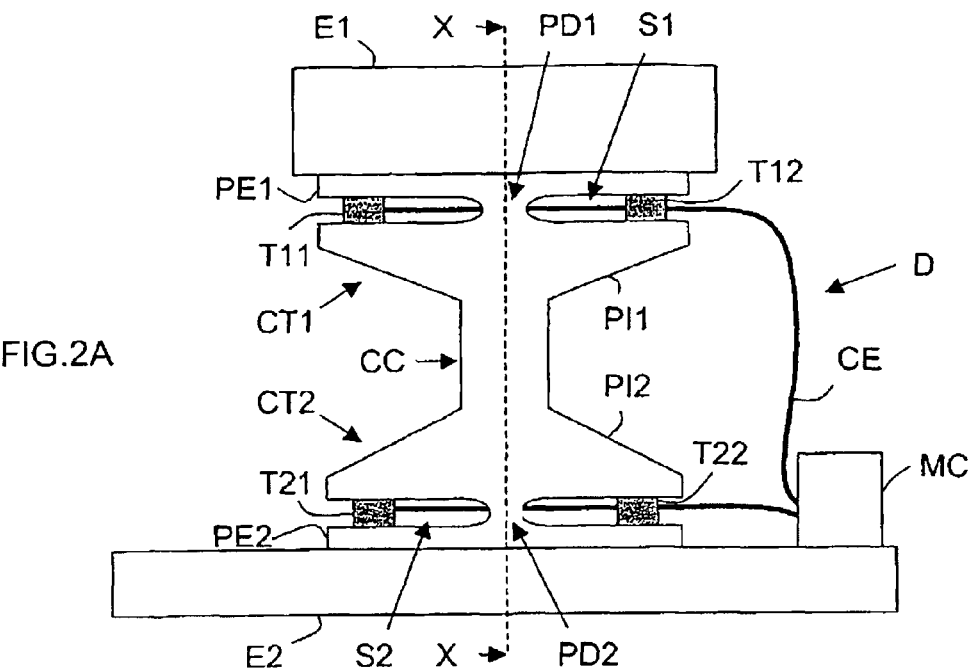
FIGS. 2A and 2B illustrate in schematic front views a second exemplary embodiment of a fixing device according to the invention, also of the "active flexible blade" type, in the inactive phase and the active phase respectively.
Figure 2B:
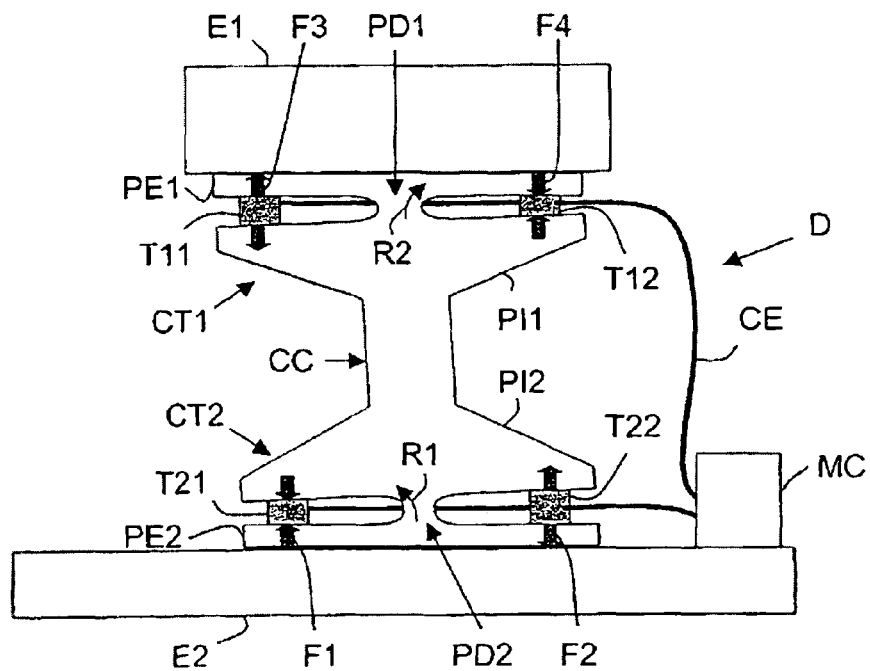
Figure 3:
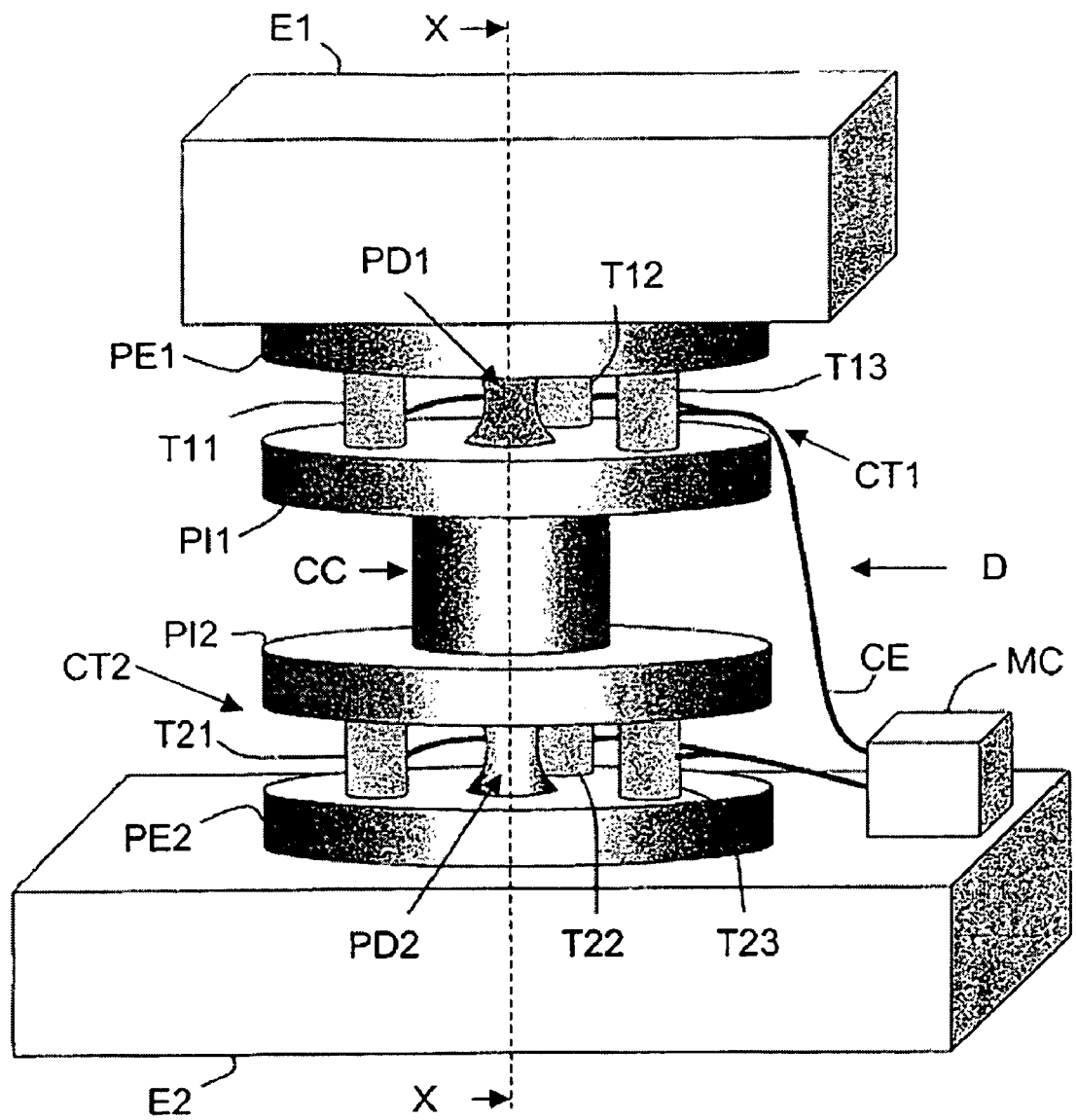
FIG. 3 illustrates in a schematic perspective view a third exemplary embodiment of a fixing device according to the invention, in the inactive phase.

Reference is now made to FIGS. 2A and 2B in order to describe a second exemplary embodiment of a fixing device D according to the invention. It is a variant of the first embodiment previously described with reference to FIGS. 1A and 1B. This second embodiment differs from the first through the fact that each terminal body CTi comprises two transducers Ti1 and Ti2, working in an antagonistic manner, and not a single transducer. This arrangement is in fact intended to eliminate a drawback of the first exemplary embodiment connected with the presence of a single transducer Tij in each terminal body CTi and requiring that each piezoelectric transducer Tij be prestressed.

In this second embodiment, the control module MC controls the micropositioning and/or the stress-compensation via the four transducers (T11, T12, T21 and T22).

For example, and as illustrated in FIG. 2B, when the control module MC is working in stress compensation mode, it receives a measurement current coming from one of the transducers Tij, for example the first T1i, of the terminal body CTi, for example CT2, caused by a first misorientation (R1) of its external part PE2 relative to its internal part PI2. It then determines the first axial dimensional change which corresponds to this measurement current, then it generates three control currents. In the example illustrated in FIG. 2B, the first axial dimensional change is a reduction in thickness (but this may be the contrary), marked by the arrows F1.

The first control current is destined for the second transducer T22 of the second terminal body CT2. It is determined in such a way that the second transducer T22 converts it into a second axial dimensional change with a opposite sign to the first axial dimensional change and the same amplitude. This second axial dimensional change is here an increase in thickness, marked by the arrows F2.

The second control current is destined for the first transducer T11 of the first terminal body CT1. It is determined in such a way that the first transducer T11 converts it into a third axial dimensional change intended to cause a second misorientation (R2) of the external part PE1 of its terminal body CT1 relative to its internal part PI1, opposed to the first misorientation. This third axial dimensional change is here an increase in thickness, marked by the arrows F3.

The third control current is destined for the second transducer T12 of the first terminal body CT1. It is determined in such a way that the second transducer T12 converts it into a fourth axial dimensional change with a opposite sign to the third axial dimensional change and having the same amplitude. This fourth axial dimensional change is here a reduction in thickness, marked by the arrows F4.

When the control module MC controls the micropositioning, it determines the measurement currents for the four transducers Tij in such a way that they work within the same terminal body CTi in an antagonistic manner.

The two exemplary embodiments described above offer only one or two degrees of freedom (translation in the direction YY' and possibly a rotation). However, other exemplary embodiments offering more, for example three or four, degrees of freedom are conceivable. A (third) embodiment of this type is illustrated in FIG. 3.

In this third embodiment, each terminal body CTi comprises inside its free space Si three piezoelectric transducers Tij (j=1 to 3) placed at 120° to each other relative to the axis XX.

The device here is symmetric relative to a symmetry element of the axis-of-symmetry type constituted by the axis XX.

As illustrated, the internal rigid part PIi and/or the external rigid part PEi of each terminal body CTi may, for example, take the form of platforms, optionally of a circularly cylindrical general shape. Furthermore, the flexible intermediate part PDi of each terminal body CTi may, for example, have a diabolo shape. This type of shape is in fact well suited to rotations (or inclinations) in all directions.

The terminal bodies CTi here are symmetric relative to the axis of symmetry XX.

The central body CC here is, by way of example, circularly cylindrical in shape. Here it is symmetric relative to the axis of symmetry XX.

The modes of operation offered by this third exemplary embodiment are identical to those described above with reference to FIGS. 1 and 2. The only difference lies in the fact that the possibilities for micropositioning are more numerous and that a large number of compensations can be carried out, due to the presence of a triplet of transducers Tij in each terminal body CTi.

For example, when the control module MC controls the micropositioning, it determines measurement currents for the six transducers Tij in such a way that they work in a combined manner as a triplet within the same terminal body CTi. In fact, for a triplet of transducers Tij, two control currents allow the first misorientation at a terminal body CTi to be fixed, while the third control current serves to position the third transducer in an antagonistic manner relative to the combination of the two others.

When the control module is working in stress compensation mode, it receives at least one measurement current coming from at least one of the transducers Tij of one the terminal bodies CTi, caused by a first misorientation of its external part PEi relative to its internal part PIi. It then determines each axial dimensional change corresponding to each measurement current received. It then generates, on the one hand, a control current for each transducer, from the same terminal body CTi, that has not transmitted a measurement current, so that this converts it into a chosen axial dimensional change, and, on the other hand, control currents destined for the three transducers from the other terminal body CTi' so that these transducers convert them into axial dimensional changes causing a second misorientation of the external part PEi' of their terminal body CTi' relative to its internal part PIi', opposed to the first misorientation.

It is important to note that, no matter what its embodiment, the control module MC may optionally be activated and deactivated at chosen times. For example, the fixing device D according to the invention is blocked during launch, then activated once the satellite that it is loaded on has reached orbit at the location planned for its mission.

The device may, for example, be activated by onboard software during the observation phases of the mission.

The invention offers a certain number of advantages, among which are:
- the device D may be miniaturized so as to be adapted to the load of the first piece of equipment having to be joined to the second piece of equipment, such that its mass and its bulk remain low;
- as a result of the device D enabling interface stresses to be reduced in orbit, equipment with high dimensional stability can be conceived and designed in a less robust manner, which leads to a reduction in mass;
- the device D comprises flexible mechanical components, deformed in an elastic manner; it does not involve any friction or rolling likely to accelerate aging, to impair its reliability or to generate particulate pollution; and
- the ranges of adjustment offered by the device D allow simplified integration procedures.

The invention is not limited to the embodiments of the fixing device and of the equipment described above, solely by way of example, but encompasses all the variants that a person skilled in the art might envision within the scope of the following claims.

Hence, in what precedes, an application of the invention to fine positioning of one piece of equipment relative to another has been presented. However, the invention also relates to the alignment or the quasi-static micropositioning of one piece of equipment relative to another.

The invention claimed is:

1. A device for fixing a first piece of equipment (E1) relative to a second piece of equipment (E2), comprising: (i) a structure comprising a rigid central body (CC) and two approximately identical terminal bodies (CTi), prolonging two opposite ends of said central body (CC), and each comprising a neck defining a flexible intermediate part (PDi) that is symmetric relative to a symmetry element, having a first extension relative to this symmetry element, situated in a central position and prolonged by a rigid internal part (PIi) that is symmetric relative to said symmetry element, having a second extension relative to said symmetry element greater than the first and joined to one of said ends of the central body (CC), and by a rigid external part (PEi) that is symmetric relative to said symmetry element, having a third extension relative to said symmetry element greater than the first, spaced from said internal part (PIi) and intended to be joined to said first (E1) or second (E2) piece of equipment; (ii) at least two piezoelectric transducers (Tij) respectively housed in free spaces (Si) defined between the internal (PIi) and external (PEi) parts of the two terminal bodies (CTi) and each set up to convert either an axial dimensional change into a measurement current representing the amplitude of said change, or a control current into a corresponding axial dimensional change; and (iii) control means (MC) set up to determine at least one axial dimensional change for at least one of said transducers (Tij) so as to locate said first piece of equipment (E1) in a chosen position relative to said second piece of equipment (E2).

2. The device as claimed in claim 1, wherein said control means (MC) are set up to determine an axial dimensional change for each transducer (Tij) so as to locate said first piece of equipment (E1) in a chosen position relative to said second piece of equipment (E2).

3. The device as claimed in claim 1, wherein said control means (MC) are set up, in the case of receiving a measurement current coming from a transducer (Tij) of one of said terminal bodies (CTi) caused by a first misorientation of its external part (PEi) relative to its internal part (PIi), to determine the corresponding axial dimensional change and to generate a control current destined for the transducer (Ti'j) of the other terminal body (CTi') so that this transducer converts it into an axial dimensional change able to cause a second misorientation of the external part (PEi') of its terminal body (CTi') relative to its internal part (PIi'), opposed to the first misorientation.

4. The device as claimed in claim 1, wherein each free space (Si) in a terminal body (CTi) houses at least one of the first (Ti1) and second (Ti2) piezoelectric transducers intended to function antagonistically, and in that said control means (MC) are set up, in the case of receiving a measurement current coming from the first transducer (Ti1) of one of said terminal bodies (CTi) caused by a first misorientation of its external part relative to its internal part, to determine the first corresponding axial dimensional change and to generate (i) a first control current destined for the second transducer (Ti2) of the same terminal body (CTi) so that this transducer converts it into a second axial dimensional change of opposite sign to the first axial dimensional change and with the same amplitude, (ii) a second control current destined for the first transducer (Ti'1) of the other terminal body (CTi') so that this transducer converts it into a third axial dimensional change causing a second misorientation of the external part of its terminal body (CTi') relative to its internal part, opposed to the first misorientation, and (iii) a third control current destined for the second transducer (Ti'2) of this other terminal body (CTi') so that this transducer converts it into a fourth axial dimensional change of opposite sign to said third axial dimensional change and with the same amplitude.

5. The device as claimed in claim 1, wherein each free space (Si) in a terminal body (CTi) houses three piezoelectric transducers (Tij) placed at 120° to each other.

6. The device as claimed in claim 5, wherein said control means (MC) are set up, in the case of receiving at least one measurement current coming from at least one of the transducers (Tij) of one of said terminal bodies (CTi) caused by a first misorientation of its external part relative to its internal part, to determine each corresponding axial dimensional change and to generate (i) a control current destined for each transducer (Tij') of this same terminal body (CTi) which has not transmitted a measurement current, so that this transducer converts it into an axial dimensional change, and (ii) control currents destined for the three transducers (Ti'j) of the other terminal body (CTi') so that these transducers convert them into axial dimensional changes causing a second misorientation of the external part of their terminal body (CTi) relative to its internal part, opposed to the first misorientation.

7. The device as claimed in claim 1, wherein at least one of said internal (PIi) and external (PEi) parts of each terminal part (CTi) is a platform of chosen shape, and in that the intermediate part (PDi) of each terminal body has a diabolo shape.

8. The device as claimed in claim 1, wherein said transducers (Tij) are produced in a piezoelectric material chosen from a group comprising at least piezoelectric single crystals and piezoelectric ceramics.

9. The device as claimed in claim 8, wherein said transducers (Tij) consist of at least one stack of at least one layer of said piezoelectric material.

10. The device as claimed in claim 1, comprising at least one sensor set up to deliver signals representing at least one physical quantity, and in that said control means (MC) are set up to determine the axial dimensional changes depending on said signals.

11. The device as claimed in claim 1, wherein said control means (MC) are set up to be activated and deactivated at chosen times.

12. The device as claimed in claim 1, wherein said control means (MC) are set up to operate in position-control mode.

13. A piece of equipment (E1, E2), comprising at least one fixing device (D) as claimed in claim 1.

14. Use of the fixing device (D) and of the equipment (E1, E2) as claimed in claim 1 in the field of space technology.

15. The device as claimed in claim 2, wherein each free space (Si) in a terminal body (CTi) houses three piezoelectric transducers (Tij) placed at 120° to each other.

16. The device as claimed in claim 3, wherein each free space (Si) in a terminal body (CTi) houses three piezoelectric transducers (Tij) placed at 120° to each other.

17. The device as claimed in claim 2, wherein at least one of said internal (PIi) and external (PEi) parts of each terminal part (CTi) is a platform of chosen shape, and in that the intermediate part (PDi) of each terminal body has a diabolo shape.

18. The device as claimed in claim 5, wherein at least one of said internal (PIi) and external (PEi) parts of each terminal part (CTi) is a platform of chosen shape, and in that the intermediate part (PDi) of each terminal body has a diabolo shape.

19. The device as claimed in claim 5, wherein said transducers (Tij) are produced in a piezoelectric material chosen from a group comprising at least piezoelectric single crystals and piezoelectric ceramics.

20. The device as claimed in claim 5, comprising at least one sensor set up to deliver signals representing at least one physical quantity, and in that said control means (MC) are set up to determine the axial dimensional changes depending on said signals.

* * * * *